3,679,484
Patented July 25, 1972

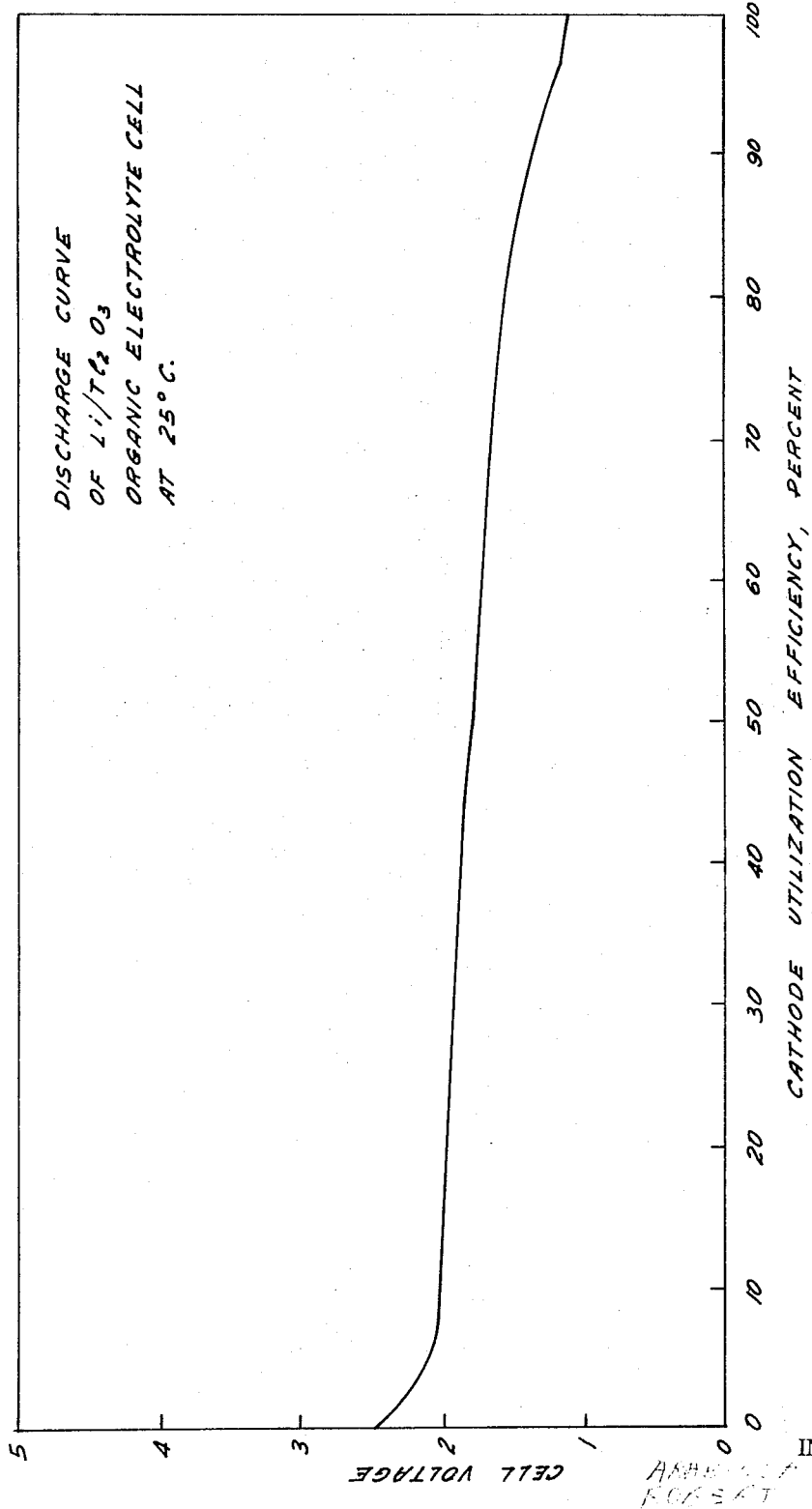

3,679,484
LITHIUM-THALLIUM (ic) OXIDE ORGANIC ELECTROLYTE CELL

Arabinda N. Dey, Needham, and Robert W. Holmes, Boston, Mass., assignors to P. R. Mallory & Co., Inc., Indianapolis, Ind.
Filed July 15, 1970, Ser. No. 55,169
Int. Cl. H01m 23/02
U.S. Cl. 136—83 R          6 Claims

ABSTRACT OF THE DISCLOSURE

This invention relates to a novel high energy density primary battery comprising at least one positive plate composed of a mixture of thallium (ic) oxide ($Tl_2O_3$) and a conductive diluent, and at least one negative plate having a metal selected from the group of light metals, said plates being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide and the mixtures thereof, and having dissolved therein soluble salts of the light metals, for example, the perchlorates, hexafluorophosphates, tetrafluoroborates, tetrachloroaluminates, hexafluoarsenates of lithium.

It has been discovered that thallium (ic) oxide ($Tl_2O_3$) can be used as a depolarizer in lithium-organic electrolyte cells. To our knowledge, the material has never been used in any wet or dry cells because of its intrinsic deficiencies in the existing acid or alkaline systems. These deficiencies were successfully overcome according to this invention, by the use of organic electrolytes. The material was found to be exceedingly stable in the organic electrolytes, and was discharged with high utilization efficiency. The objects of the invention are:

(1) To provide a cell with high voltage,
(2) To provide a cell with high volumetric and gravimetric energy density,
(3) To provide a cell with high material utilization efficiency,
(4) To provide a primary cell with long shelf life,
(5) To provide a cell with relatively steady output voltage throughout the life of the cells,
(6) To provide a cell which does not exhibit any spontaneous gassing during the storage and during the operation of the cell.

DESCRIPTION

Finely divided $Tl_2O_3$ was mixed with finely divided graphite in 70:30 weight ratio using a "Waring" blender. The mix was then pelletized into small pellets using a pressure of 20–40 tons per square inch. The pellets were then broken mechanicaly to a granular mix which was then treated with an aqueous Teflon dispersion (commonly known as colloidal Teflon) so that the amount of solid Teflon content was approximately 3 to 5% by weight of the mix. This was then treated with isopropyl alcohol and mechanically kneaded to form a rubbery material. This rubbery material was used to mold rectangular cathodes (2.27 cm. x 0.95 cm.) on expanded nickel current collector, using a molding pressure of 20,000 to 40,000 p.s.i. in a suitable die. The cathodes were then cured at 200° C. for 2 hours.

Li/$Tl_2O_3$ cells were constructed in parallel plate configuration using two rectangular lithium anodes (made by pressing 0.015" thick lithium ribbon on expanded stainless steel current collector) placed on either side of the above rectangular $Tl_2O_3$ cathode, using one layer of filter paper separator on each side. The cells were packaged in a foil laminate (aluminum foil laminated with polyethylene) bag with 1 M $LiClO_4$ in tetrahydrofuran (THF) electrolyte and were heat sealed.

OPERATION

The initial open circuit voltage of the above cell was 3.3 volts. The cell was discharged at a constant current of 4.5 ma. (1.04 ma./cm.$^2$). This corresponded to a 30 hr. rate of discharge. The discharge curve of the Li/$Tl_2O_3$ cell is shown in FIG. 1. The initial operating voltage was slightly above 2.0 volt and 80% of the cathode was utilized before the cell voltage dropped to 1.5 volts. The recovered open circuit voltage on discontinuing the discharge at the early stage was found to be 2.5 volts. This was considered the practical open circuit voltage.

The postulated cathodic reaction on which the material utilization efficiency was based was $$Tl_2O_3 + 6Li^+ + 6e^- \rightarrow 2Tl + 3Li_2O$$

The recoverable volumetric capacity of the $Tl_2O_3$ depolarizer was found to be 46 a. hr./in.$^3$ based on the active material. This compares favorably with the theoretical volumetric capacity of 45 a. hr./in.$^3$ of HgO depolarizer.

Furthermore, the Li/$Tl_2O_3$ organic electrolyte system did not exhibit any gassing during storage or during operation, unlike that of the existing alkaline and acidic systems.

In a similar fashion it is thought that sodium, potassium, aluminum, magnesium, calcium and beryllium as an anode material will result in beneficial results as does lithium.

SCOPE OF THE INVENTION

The invention is applicable to all primary cells with:
(1) Light metal anodes, e.g., Li, Na, K, Al, Mg, Ca and Be.
(2) Organic solvents such as tetrahydrofuran, N-nitrosodimethylamine, dimethyl sulfite, propylene carbonate, dimethyl sulfoxide, dimethyl formamide, gamma-butyrolacetone, dimethyl carbonate, methyl formate, butylformate, acetonitrile, dimethoxy ethane and the mixtures thereof.
(3) Electrolytes comprising above solvents and all soluble salts of Li, Na, K, Mg, Be, Ca and Al. The perchlorates, hexafluorophosphates, tetrafluoroborates, tetrachloroaluminates, hexafluoroarsenates of lithium are particularly suitable.

What is claimed is:
1. A novel high energy density primary battery comprising at least one positive plate composed of a mixture of thallium (ic) oxide ($Tl_2O_3$) and a conductive diluent, and at least one negative plate having a metal selected from the group of light metals, said plates being disposed in an electrolyte comprising an organic solvent selected from the group consisting of tetrahydrofuran, N-nitrosodimethylamine, dimethyl sulfite, propylene carbonate, gamma-butyrolactone, dimethyl carbonate, dimethoxy ethane, acetonitrile, dimethyl sulfoxide, dimethyl formamide and the mixtures thereof, and having dissolved therein soluble salts of the light metals.
2. The battery in claim 1 in which the electrolyte consists of a solution of lithium perchlorate in tetrahydrofuran.
3. The battery in claim 1 in which the light metal anode is lithium.
4. The battery in claim 1 wherein the organic solvent is a mixture of tetrahydrofuran, propylene carbonate and gamma-butyrolactone.
5. The battery in claim 1 in which the soluble salt is a material selected from the group consisting of the perchlorates, hexafluorophosphates, tetrafluoroborates, tetrachloroaluminates, and hexafluoroarsenates of lithium.

6. The battery in claim 1 in which the conductive diluent is graphite.

References Cited

UNITED STATES PATENTS

| | | | |
|---|---|---|---|
| 2,081,926 | 6/1937 | Gyuris | 136—83 R |
| 3,468,716 | 9/1969 | Eisenberg | 136—100 |
| 3,508,966 | 4/1970 | Eisenberg | 136—6 |
| 3,540,937 | 11/1970 | Kumano et al. | 136—137 |
| 3,562,017 | 2/1971 | Lyall | 136—137 |
| 3,578,500 | 5/1971 | Maricle et al. | 136—6 |

ANTHONY SKAPARS, Primary Examiner

U.S. Cl. X.R.

136—137, 154